(12) United States Patent
Rhea et al.

(10) Patent No.: US 11,164,180 B1
(45) Date of Patent: Nov. 2, 2021

(54) PRIVACY PRESERVATION IN PRIVATE CONSENSUS NETWORKS

(71) Applicant: United Services Automobile Association (USAA), San Antonio, TX (US)

(72) Inventors: Jonathan Huntington Rhea, North Richland Hills, TX (US); Bharat Prasad, San Antonio, TX (US); Minya Liang, Redmond, WA (US); Joseph Gregory Delong, San Antonio, TX (US); Steven J. Schroeder, Oak Point, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 254 days.

(21) Appl. No.: 16/533,051

(22) Filed: Aug. 6, 2019

Related U.S. Application Data

(60) Provisional application No. 62/714,889, filed on Aug. 6, 2018.

(51) Int. Cl.
| | | |
|---|---|---|
| *G06Q 20/36* | (2012.01) | |
| *H04L 9/06* | (2006.01) | |
| *G06Q 20/38* | (2012.01) | |
| *G06Q 20/06* | (2012.01) | |

(52) U.S. Cl.
CPC ..... *G06Q 20/3678* (2013.01); *G06Q 20/0658* (2013.01); *G06Q 20/3674* (2013.01); *G06Q 20/3821* (2013.01); *G06Q 20/3827* (2013.01); *H04L 9/0637* (2013.01)

(58) Field of Classification Search
CPC .......... G06Q 20/3678; G06Q 20/0658; G06Q 20/3674; G06Q 20/3821; G06Q 20/3827; H04L 9/0637
USPC .......................................................... 705/69
See application file for complete search history.

(56) References Cited

U.S. PATENT DOCUMENTS

| | | | |
|---|---|---|---|
| 2017/0353309 A1 | 12/2017 | Gray | |
| 2018/0130034 A1* | 5/2018 | Taylor | G06Q 20/02 |
| 2018/0130050 A1* | 5/2018 | Taylor | H04L 9/3247 |
| 2019/0188706 A1 | 6/2019 | McCurtis | |
| 2019/0324958 A1 | 10/2019 | Ow et al. | |
| 2020/0304288 A1 | 9/2020 | Schwartz et al. | |
| 2020/0410491 A1* | 12/2020 | Ronnow | G06Q 20/401 |
| 2021/0203476 A1* | 7/2021 | Ruit | H04L 9/3236 |

OTHER PUBLICATIONS

ShenTu et al., "Transaction Remote Release (TRR): A New Anonymization Technology for Bitcoin", Sep. 21, 2015, 18 pages (Year: 2015).*

* cited by examiner

*Primary Examiner* — James D Nigh
(74) *Attorney, Agent, or Firm* — Fish & Richardson P.C.

(57) ABSTRACT

Implementations of the present disclosure include determining that a private transaction is to be recorded in a distributed ledger system (DLS) based on a consensus protocol executed by a set of entities participating in the DLS, the private transaction including a transaction between a subset of entities of the set of entities, providing a set of noisy transactions based on a transaction model, and transmitting data representative of at least a portion of the private transaction, and data representative of each noisy transaction in the set of noisy transactions for recording in the DLS based on the consensus protocol.

20 Claims, 4 Drawing Sheets

PRIVACY PRESERVATION IN PRIVATE CONSENSUS NETWORKS

CROSS REFERENCE TO RELATED APPLICATION

This application is a non-provisional of and claims priority to U.S. Provisional Patent Application No. 62/714,889, filed on Aug. 6, 2018, the entire contents of which is hereby incorporated by reference.

BACKGROUND

Distributed ledger systems (DLSs), which can also be referred to as consensus networks, and/or blockchain networks, enable participating entities to securely, and immutably store data. Example types of DLSs can include public DLSs, and private DLSs. A public DLS is open for all entities to use the DLS, and participate in the consensus process. A private DLS is provided for a particular entity, which centrally controls read and write permissions.

Another type of DLS includes a consortium DLS. A consortium DLS is provided for a select group of entities, which control the consensus process, and includes an access control layer. Consequently, one or more entities participating in the consortium DLS have control over who can access the consortium DLS, and who can participate in the consensus process of the consortium DLS. For example, a group of institutions (e.g., financial institutions) can participate in a consortium DLS to immutably record transactions. In some examples, an entity can be able to access/view data within the consortium DLS, but not contribute data to the consortium DLS.

SUMMARY

Implementations of the present disclosure include computer-implemented methods for privacy preservation in private consensus networks. More particularly, implementations of the present disclosure are directed to obviating a private transaction channel by injecting noise into private transactions and public transactions that are recorded in a global ledger.

In some implementations, actions include determining that a private transaction is to be recorded in a distributed ledger system (DLS) based on a consensus protocol executed by a set of entities participating in the DLS, the private transaction including a transaction between a subset of entities of the set of entities, providing a set of noisy transactions based on a transaction model, and transmitting data representative of at least a portion of the private transaction, and data representative of each noisy transaction in the set of noisy transactions for recording in the DLS based on the consensus protocol. Other implementations include corresponding systems, apparatus, and computer programs, configured to perform the actions of the methods, encoded on computer storage devices.

These and other implementations may each optionally include one or more of the following features: actions further include determining a number of noisy transactions to be generated for the set of noisy transactions based on a signal-to-noise ratio; the signal-to-noise ratio is determined for a current settlement period, and is based on a statistical value of private transactions across multiple settlement periods, and a statistical value of noisy transactions across the multiple settlement periods; action further include calculating an identifier assigned to the private transaction based on a hash function, and a secret nonce value that is shared between entities in the subset of entities; the transaction model is representative of one or more features of historical transaction data representative of transactions between entities in the subset of entities; the DLS includes a consortium DLS; and the private transaction, noisy transactions in the set of noisy transactions, and a plurality of public transactions are recorded in the DLS based on the consensus protocol.

The present disclosure also provides one or more non-transitory computer-readable storage media coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure may include any combination of the aspects and features described herein. That is, methods in accordance with the present disclosure are not limited to the combinations of aspects and features specifically described herein, but also include any combination of the aspects and features provided.

The subject matter described in this specification can be implemented in particular embodiments so as to realize one or more of the following advantages. By obfuscating a private transaction with noise in the form of fake transactions (also referred to herein as noisy transactions), the techniques described in this specification can (i) prevent other participating entities, which are not involved in the private transaction, from discerning the private transaction from the noisy transactions within the global blockchain, and (ii) allow the subset of entities (e.g., two or more entities) involved in the private transaction to discern the private transactions from the noisy transactions based on a shared secret. Thus, the techniques disclosed herein enable all transactions, even private transactions between a subset of participating entities, to be processed using the global consensus protocol (e.g., Raft, PBFT), and stored in the global blockchain. This consensus methodology avoids segmentation between a private state database and a public state database within each node, thereby reducing system complexity. In particular, each node need only maintain a public state database, replicated global blockchain, that is in perfect state consensus across all nodes in the consortium DLS. Therefore, systems that implement techniques described in this specification can reduce computer resources (e.g., reduce memory) needed to maintain a private state database at each node, and at the same time, can validate a private transaction more accurately and securely than prior systems by using a consensus protocol without exposing private information related to the transaction.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure include computer-implemented methods for privacy preservation in private consensus networks. More particularly, implementations of the present disclosure are directed to obviating a private transaction channel by injecting noise into private transactions and public transactions that are recorded in a global ledger. In some implementations, actions include determining that a private transaction is to be recorded in a distributed ledger system (DLS) based on a consensus protocol executed by a set of entities participating in the DLS, the private transaction including a transaction between a subset of entities of the set of entities, providing a set of noisy transactions based on a transaction model, and transmitting data representative of at least a portion of the private transaction, and data representative of each noisy transaction in the set of noisy transactions for recording in the DLS based on the consensus protocol.

To provide further context for implementations of the present disclosure, and as introduced above, DLSs, which can also be referred to as consensus networks (e.g., made up of peer-to-peer nodes), and blockchain networks, enable participating entities to securely, and immutably store data. A DLS can be provided as a public DLS, a private DLS, or a consortium DLS. Implementations of the present disclosure are described in further detail herein with reference to a consortium DLS, which is private among the participating entities. It is contemplated, however, that implementations of the present disclosure can be realized in any appropriate type of DLS.

In a consortium DLS, the consensus process is controlled by an authorized set of nodes, one or more nodes being operated by a respective entity (e.g., a financial institution, insurance company). For example, a consortium of ten (10) entities (e.g., financial institutions, insurance companies) can operate a consortium DLS, each of which operates at least one node in the consortium DLS. Accordingly, the consortium DLS can be considered a private network with respect to the participating entities. In some examples, each entity (node) must sign every block in order for the block to be valid, and added to the DLS. In some examples, at least a sub-set of entities (nodes) (e.g., at least 7 entities) must sign every block in order for the block to be valid, and added to the DLS. An example consortium DLS includes Quorum, developed by J.P. Morgan Chase & Co. of New York, N.Y. Quorum can be described as an enterprise-focused, permissioned DLS (blockchain) infrastructure specifically designed for financial use cases. Quorum is built off of Go Ethereum, the base code for the Ethereum blockchain, which is provided by the Ethereum Foundation of Zug, Switzerland.

Figure 1:
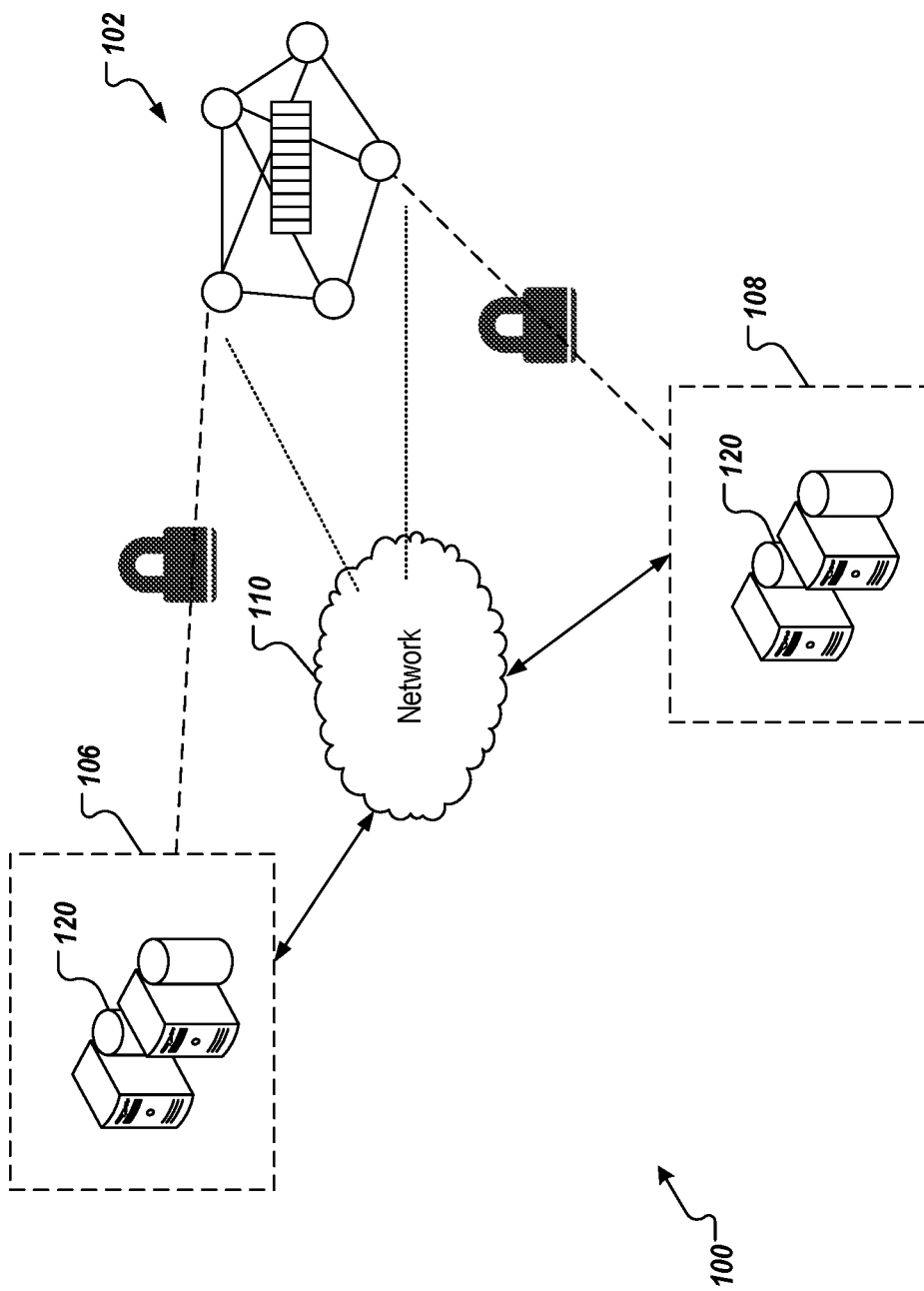
FIG. 1 depicts an example environment that can be used to execute implementations of the present disclosure.

FIG. 1 depicts an example environment 100 that can be used to execute implementations of the present disclosure. In some examples, the example environment 100 enables entities to participate in a consortium DLS 102. The example environment 100 includes back-end systems 106, 108, and a network 110. In some examples, the network 110 includes a local area network (LAN), wide area network (WAN), the Internet, or a combination thereof, and connects web sites, user devices (e.g., computing devices), and back-end systems (e.g., the back-end systems 106, 108). In some examples, the network 110 can be accessed over a wired and/or a wireless communications link.

In the depicted example, the back-end systems 106, 108 each include at least one server system 120. In some examples, the at least one server system 120 hosts one or more computer-implemented services for interacting with the consortium DLS 102. For example, the back-end system 106 can host computer-implemented services of a first entity (e.g., financial institution), such as transaction management system that the first entity uses to manage its transactions with one or more other entities (e.g., financial transactions). The back-end system 108 can host computer-implemented services of a first entity (e.g., financial institution), such as transaction management system that the second entity uses to manage its transactions with one or more other entities (e.g., financial transactions). In the example of FIG. 1, the consortium DLS 102 is represented as a peer-to-peer network of nodes, and the back-end systems 106, 108 provide nodes of the first entity, and second entity respectively, which participate in the consortium DLS 102.

Figure 2:
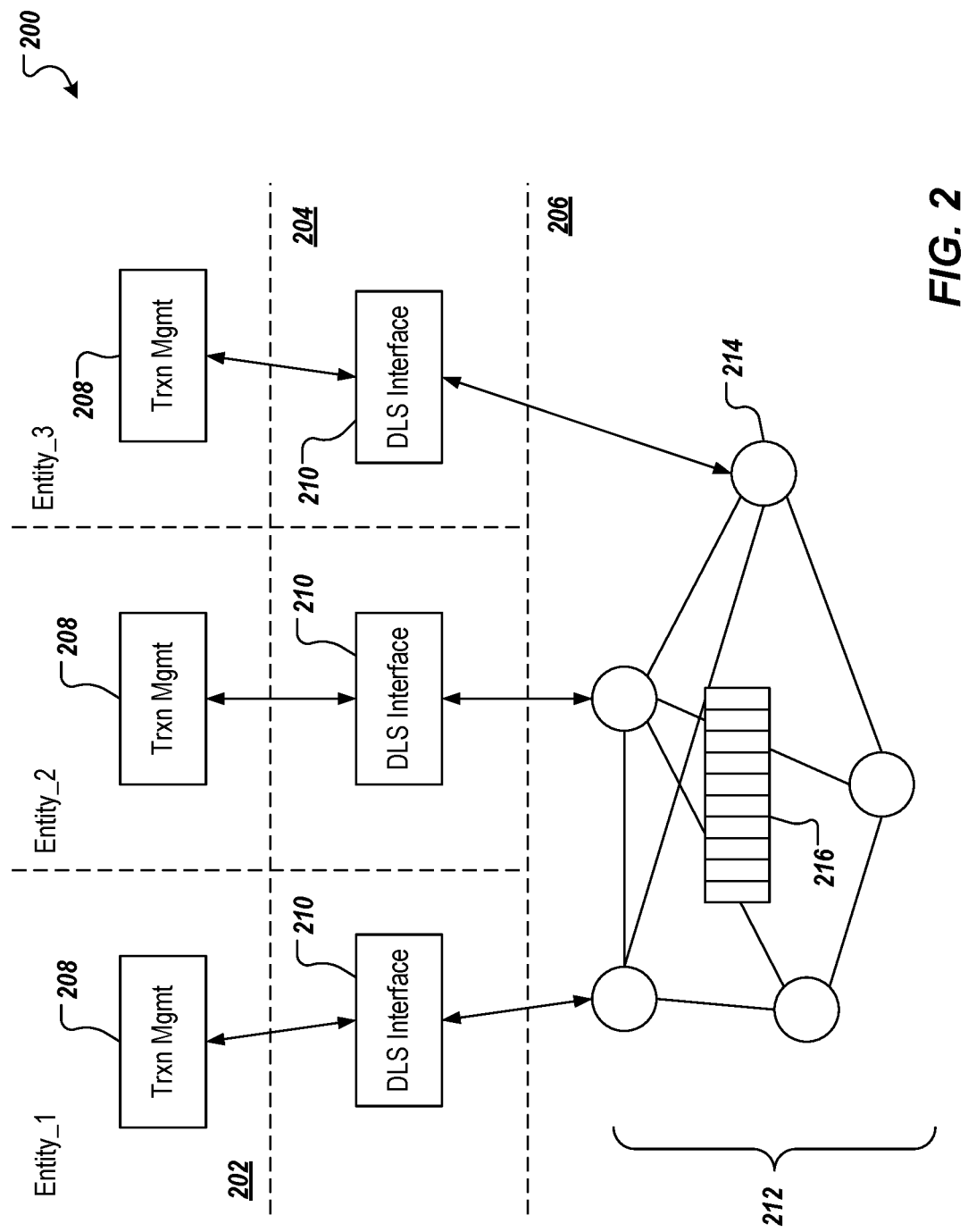
FIG. 2 depicts an example conceptual architecture in accordance with implementations of the present disclosure.

FIG. 2 depicts an example conceptual architecture 200 in accordance with implementations of the present disclosure. The example conceptual architecture 200 includes an entity layer 202, a hosted services layer 204, and a consortium DLS layer 206. In the depicted example, the entity layer 202 includes three entities, Entity_1 (E1), Entity_2 (E2), and Entity_3 (E3), each entity having a respective transaction management system 208.

In the depicted example, the hosted services layer 204 includes DLS interfaces 210 for each transaction management system 210. In some examples, a respective transaction management system 208 communicates with a respective DLS interface 210 over a network (e.g., the network 110 of FIG. 1) using a protocol (e.g., hypertext transfer protocol secure (HTTPS)). In some examples, each DLS interface 210 provides communication connection between a respective transaction management system 208, and the DLS layer 206. More particularly, the DLS interface 210 communicate with a DLS 212 of the DLS layer 206. In some examples, communication between a DLS interface 210, and the DLS layer 206 is conducted using remote procedure calls (RPCs). In some examples, the DLS interfaces 210 "host" DLS nodes for the respective transaction management systems 208. For example, the DLS interfaces 210 provide the API for access to DLS 212.

As described herein, the DLS 212 is provided as a peer-to-peer network including a plurality of nodes 214 that immutably record information in a blockchain 216. Although a single blockchain 216 is schematically depicted, multiple copies of the blockchain 216 are provided, and are maintained across the DLS 212. For example, each node 214 stores a copy of the blockchain. In some implementations, the blockchain 216 stores information associated with transactions that are performed between two or more entities participating in the consortium DLS.

In general, a consortium DLS supports multiple classes of transactions. Example classes of transactions include, without limitation, public transactions, and private transactions. A public transaction is shared with all the nodes within the consortium DLS, and are stored in a global blockchain. A global blockchain is a blockchain that is replicated across all nodes. That is, all nodes are in perfect state consensus with respect to the global blockchain. A private transaction is shared only with the transaction participants (e.g., multiple, but less than all of the entities participating in the consortium DLS). In some consortium DLSs, such as Quorum, multiple, private blockchains are maintained to record the private transactions. That is, for each node, a private blockchain is maintained for private transactions the respective entity participated in. Consequently, the state database (blockchain) is segmented, being split into a private state database, and a public state database. All nodes in the consortium DLS are in state consensus with respect to the public state database (global blockchain), but not with respect to the private state databases (private blockchains).

To achieve consensus (e.g., agreement to the addition of a block to a blockchain), a consensus protocol is implemented within the consortium DLS. An example consensus protocol includes Raft, which is a consensus algorithm that implements a leader approach. Applying Raft to a consortium DLS (cluster of nodes), one and only one elected leader (node) is responsible for managing log replication on the other nodes of the cluster. A leader leads until it fails or disconnects, in which case a new leader is elected. However, a limitation of Raft is the inability to achieve Byzantine Fault Tolerance (BFT) consensus with less than three (3) participants in the presence of a faulty node. BFT consensus generally refers to the ability for consensus to be achieved even in the presence of one or more faulty nodes. In this scenario, the consensus can tolerate, at most, F faulty nodes in a network having N validator nodes, where $N=2F+1$.

Another example consensus protocol includes Practical BFT (PBFT), which functions in asynchronous environments, such as a consortium DLS. However, a limitation of PBFT is the inability to achieve BFT consensus with less than four (4) participants in the presence of a faulty node. In this scenario, the consensus can tolerate, at most, F faulty nodes in a network having N validator nodes, where $N=3F+1$.

When considering private transactions in a consortium DLS, less than all nodes participate in the consensus protocol. In some instances, less than three or four nodes might participate. For example, in Quorum, two entities might participate in a private transaction, and each add a block to their respective private blockchains. In such instances, BFT consensus cannot be achieved, because of too small a number of validator nodes (e.g., nodes of respective entities participating in the private transaction).

An example option to mitigate this can include increasing the number of validator nodes in a private transaction. For example, an auditor node could be added to any two-party private transaction for Raft consensus to achieve at least three validator nodes. As another example, one or more auditor nodes could be added to any private transaction having less than four validator nodes for PBFT consensus. However, this reduces the privacy of the private transaction by exposing at least some information to the auditor node(s). Further, this adds to the overall complexity of the consortium DLS. Another example option to mitigate this is to discontinue the availability of recording private transactions within the consortium DLS. This, however, may make the consortium DLS impractical, and unattractive for entities to participate in.

In view of this, implementations of the present disclosure provide a consensus methodology that avoids the use of private state channels. That is, implementations of the present disclosure enable all transactions, even private transactions between a subset of participating entities, to be processed using the global consensus protocol (e.g., Raft, PBFT), and stored in the global blockchain. This avoids segmentation between a private state database, and a public state database within each node. That is, each node need only maintain a public state database, replicated global blockchain, that is in perfect state consensus across all nodes in the consortium DLS.

To achieve this, implementations of the present disclosure obfuscate transactions with noise in the form of fake transactions, also referred to herein as noisy transactions. In this manner, other participating entities, which are not involved in a private transaction are unable to discern the private transaction from the noisy transactions within the global blockchain. However, the subset of entities involved in the private transaction are able to discern the private transactions from the noisy transactions based on a shared secret.

In further detail, all transactions that are to be recorded to a block in the global blockchain are tagged with respective, unique identifiers. In accordance with implementations of the present disclosure, each identifier is generated from one of a plurality of hash functions. In some implementations, the hash function used depends on the type of transaction (e.g., a public transaction, a private transaction, a noisy transaction). For example, a first hash function (HF1) is seeded with a first nonce value (X), and is used to generate an identifier for a private transaction. In some examples, the first hash function is also used to generate identifiers for public transactions, and the first nonce value is known to all entities participating in the consortium DLS. A second hash function (HF2) is seeded with a second nonce value (Y), and is used to generate identifiers for the noisy transactions. In some examples, each entity involved in the private transaction know the second nonce value (e.g., as a shared secret). However, entities of the consortium DLS that are not involved in the private transaction are unaware of the second nonce value. Each new transaction identifier, private and noisy, is generated by incrementing a respective nonce value, and processing it through HF1, or HF2, if private or noisy, respectively, with the transaction data.

In some implementations, each identifier is provided based on the respective nonce value, and data associated with the respective transaction. For example, for a private transaction, the first nonce value, and data associated with the private transaction (e.g., payment amount, date) are processed through the first hash function to provide an identifier. As another example, for a noisy transaction, the second nonce value, and (fake) data associated with the noisy transaction (e.g., payment amount, date) are processed through the second hash function to provide an identifier. Example hash functions can include, but are not limited to, Keccak-256, and SHA3-256. Each of the hash functions are provided as one-way hash functions in that the input to the hash function cannot be deduced from the output of the hash function.

Implementations of the present disclosure can use multiple routines to provide the noisy transactions. An example, non-limiting routine is described in further detail herein. It is contemplated, however, that any appropriate routine for generating noisy transactions can be implemented.

In some implementations, noisy transactions can be generated based on historical transaction data. In some examples, the historical transaction data represents transactions between the subset of entities that are participating in a private transaction. For example, if a first entity (E1), and a second entity (E2) seek to record private transactions between them within the consortium DLS, the historical data includes transactions that had previously occurred between E1 and E2 over some period of time (e.g., 1 year). As another example, if E1, E2, and a third entity (E3) seek to record private transactions between them within the consortium DLS, the historical data includes transactions that had previously occurred between E1, E2, and E3 over some period of time (e.g., 1 year).

In some implementations, a transaction model is provided based on the historical transaction data. In some examples, a transaction model is extracted from the historical data based on one or more parameters. Example parameters can include, without limitation, frequency (e.g., frequency of the transactions), and magnitude (e.g., size, amount of the transactions). Implementations of the present disclosure are described in further detail with non-limiting reference to frequency. In some examples, the transaction model is extracted from the historical transaction data using one or more modeling techniques (e.g., curve fitting, linear regression).

As described in further detail herein, set of noisy transactions is generated using the transaction model. In some examples, a minimum number of noisy transactions is needed to obfuscate the private transactions. However, too many noisy transactions can result in inefficiencies (e.g., processing through consensus protocol, storage in global blockchain). That is, the higher the number of transactions, the more processing power required for the consensus protocol, and the larger memory footprint within the global blockchain. Accordingly, and as described in further detail herein, implementations of the present disclosure provide a mechanism for determining a number of noisy transactions that is sufficient to obfuscate the private transaction, while avoiding an over-abundance of noisy transactions.

Figure 3:
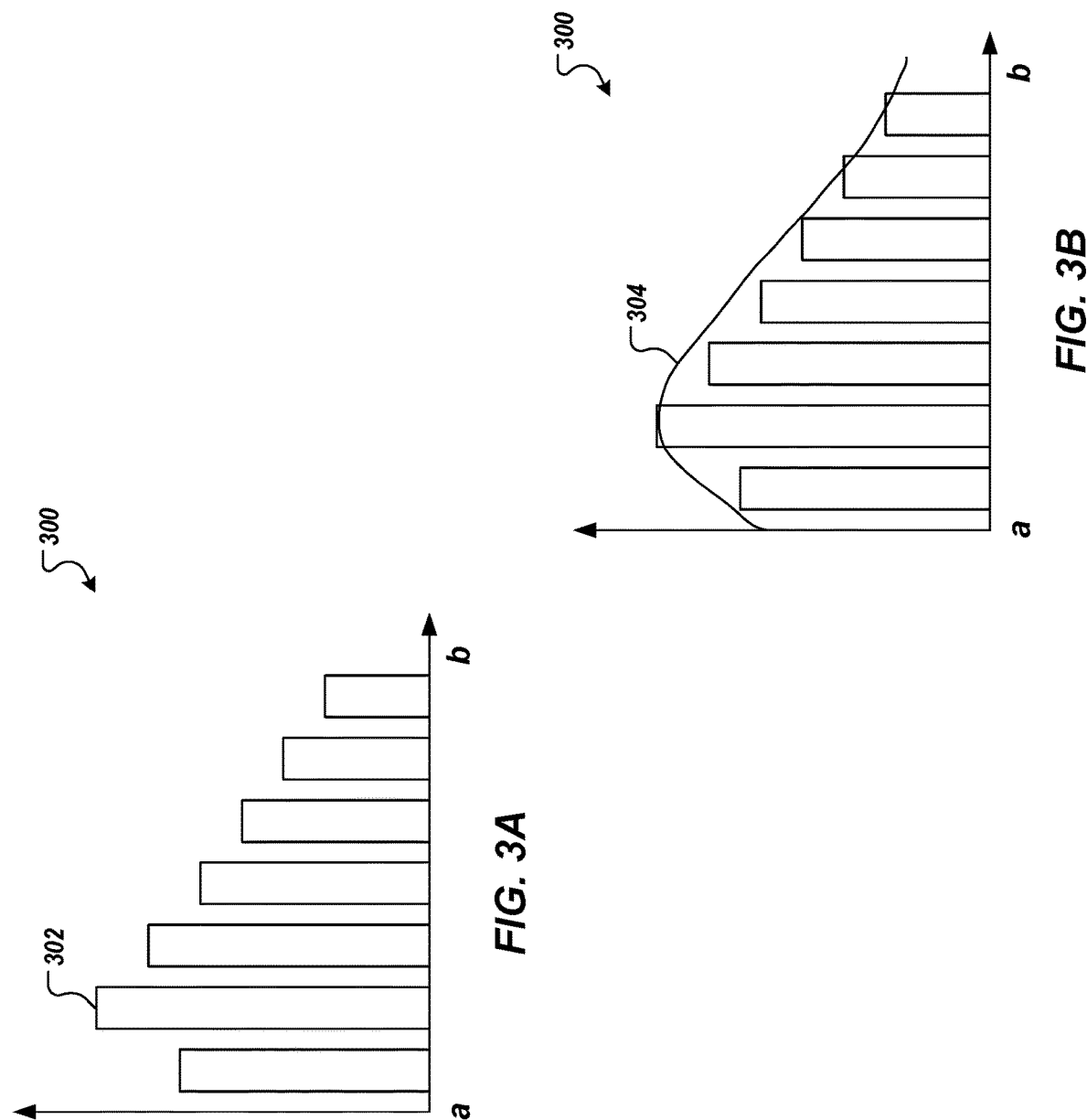
FIGS. 3A and 3B depict example modeling of historical transactions in accordance with implementations of the present disclosure.

FIGS. 3A and 3B depict example modeling of historical transactions. In a non-limiting example, the historical transactions include payments (e.g., subrogation payments) between a first entity, and a second entity. It is contemplated, however, that implementations of the present disclosure can be used for any appropriate transactions.

FIG. 3A depicts an example histogram 300 of transactions between multiple entities (e.g., E1 and E2; E1, E2, and E3), for which noisy transactions are to be generated. The example histogram 300 depicts a frequency distribution ($F_R$) over a given time period between time a, and time b. An example time period includes one year (e.g., a=Jan. 1, 2017, and b=Dec. 31, 2017. The example histogram 300 includes bins 302, each bin representing a number of transaction occurring in a sub-period of the time period. Example sub-periods can include, without limitation, days (e.g., 365 bins), weeks (e.g., 52 bins), bi-weekly (e.g., 26 bins), months (e.g., 12 bins), and quarters (e.g., 4 bins). The size of bins reflect a granularity of the histogram, and the relative precision of the transaction model developed therefrom. For example, a histogram having daily bins is more granular than a histogram having quarterly bins, and a transaction model based on daily bins is more complex, yet more precise than a transaction model based on quarterly bins.

In some examples, the granularity of the histogram can be selected based on particular needs for the noisy transactions that are to be generated. For example, for entities where transactions are relatively infrequent, larger sized bins (e.g., month, quarter) can be selected. As another example, for entities where transactions are relatively frequent, smaller sized bins (e.g., month, quarter) can be selected.

FIG. 3B depicts a graphical representation 304 of a transaction model that is generated based on the histogram 300. In some implementations, the transaction model is provided as a probability model that approximates the histogram 300. For example, the transaction model can be provided as a probability density function ($f(x)$). In some examples, the transaction model can be developed to ensure that an integral of transaction model is within a certain tolerance of the sum of all of the time periods in the frequency distribution. For example, the following relationship can be provided:

$$\int_a^b f(x) = \sum F_R + |\epsilon| \qquad (1)$$

where $\epsilon$ is an error term that effects the accuracy of the transaction model. That is, the smaller the value of $\epsilon$, the more accurate the transaction model. However, the lower the value of $\epsilon$, the more difficulty in developing the transaction model (e.g., more iterations required until Equation 1, above, is satisfied).

In some implementations, the transaction model can be updated. In some examples, the transaction model is updated based on actual transactions, and not noisy transactions that had been provided. Periodic updating of the transaction model provides improved accuracy over time.

In accordance with implementations of the present disclosure, a private transaction can occur between the entities (e.g., E1 and E2; E1, E2, and E3) over a settlement period. The private transaction for the given settlement period is to be recorded in the global blockchain of the consortium DLS. Consequently, and in accordance with implementations of the present disclosure, a set of noisy transactions is to be provided for the settlement period. Example settlement periods can include, without limitation, hourly, daily, weekly, and monthly.

In some implementations, a number of noisy transactions included in the set of noisy transactions for the given settlement period is determined, such that a signal-to-noise ratio across all settlement periods is within a predefined bound. In some examples, the predefined bound is a lower bound that provides a minimum number of noisy transactions to obfuscate the private transaction within the consortium DLS. In some implementations, the signal-to-noise ratio is provided as a ratio based on private transactions (real transactions) to noisy transactions (fake transactions). In some examples, the signal-to-noise ratio is based on statistical variances of the private transactions to the noisy transactions as provided by the following example relationship:

$$\frac{\sigma_{signal}^2}{\sigma_{noise}^2} \leq 1 \qquad (2)$$

where $\sigma_{signal}^2$ is the variance of private transactions across all settlement periods, and $\sigma_{noise}^2$ is the variance of noisy transactions across all settlement periods.

In accordance with implementations of the present disclosure, for a current settlement period, for which the number of noisy transactions in the set of noisy transactions is to be determined, the number of noisy transactions needed can be determined based on Equation 2. In some implementations, noisy transactions are provided by randomly sampling the transaction model until the number of noisy transactions determined for the current settlement period are provided. In some implementations, noisy transactions are provided for regular intervals using the transaction model until the number of noisy transactions determined for the current settlement period are provided (e.g., the number of intervals is determined based on the number of noisy transactions needed, and a noisy transaction is provided for each interval).

An identifier for the private transaction is determined based on the first hash function, and respective identifiers are determined for each of the noisy transactions based on the second hash function, as described above. The private transaction, and the noisy transactions are provided to the consortium DLS for consensus processing (e.g., Raft, PBFT) by nodes (e.g., nodes of entities that are not involved in the private transaction), and are added to the global blockchain (which is replicated across all nodes in the consortium DLS).

As private transactions are executed for subsequent settlement periods, the variance of noisy transactions across all settlement periods changes. Accordingly, the signal-to-noise ratio used to determine the number of noisy transactions is dynamic from settlement period to settlement period. This results in a variable number of noisy transactions being generated as between settlement periods. That is, each settlement period has a different amount of noise.

In some implementations, entities that expect to incur private transactions between each other, and record the transactions within the consortium DLS can perform determination, and generation of noisy transactions, as described herein. For example, E1 and E2 can agree to take turns in generating the noisy transactions for each private transaction therebetween (e.g., switch every first, second, ... $n^{th}$ settlement period). As another example, E1 and E2 can agree that E1, or E2 generates the noisy transactions. As still another example, E1 and E2 can both generate noisy transactions for each settlement period (e.g., E1 and E2 each generate half of the needed noisy transactions for the current settlement period).

In some implementations, the noisy transactions are generated by computer-executable code that is operated by, or one behalf of one or more of the entities participating in the private transaction. That is, generation of the noisy transactions is performed outside of the consortium DLS. For example, and with reference to FIG. 2, generation of the noisy transactions can be performed within the transaction management systems 208 of the respective entities.

Further, one or more entities can participate in private transactions with various different entities participating in the consortium DLS. For example, and as described above, E1 and E2 can participate in private transactions therebetween using a first nonce value (shared secret). As another example, and as described above, E1, E2, and E3 can participate in private transactions therebetween using a third nonce value (shared secret) that is different from the first nonce value. As another example, E1 and E3 can participate in private transactions therebetween using a fourth nonce value (shared secret) that is different from both the first nonce value, and the third nonce value.

Figure 4:
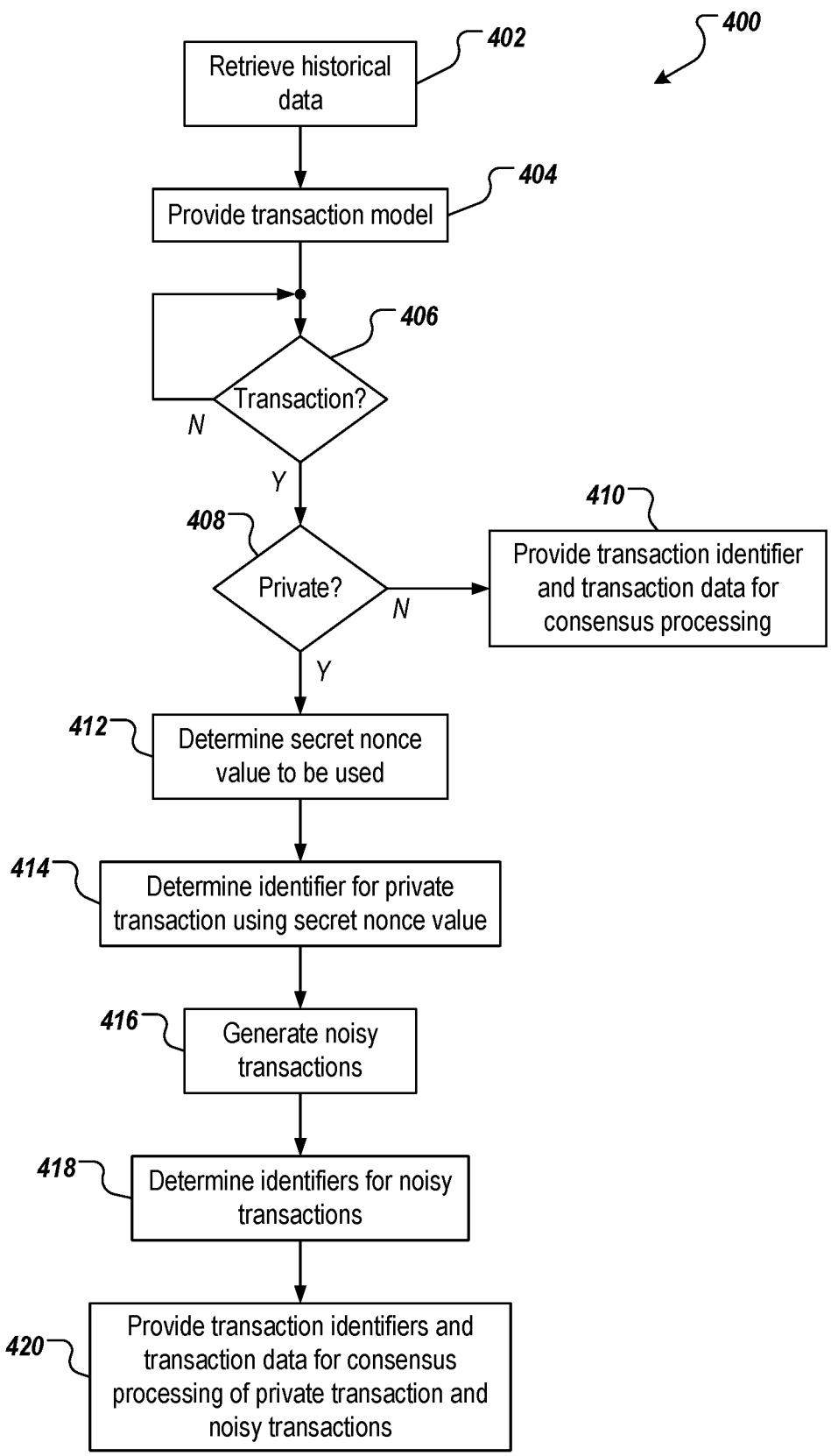
FIG. 4 depicts an example process that can be executed in accordance with implementations of the present disclosure.

FIG. 4 depicts an example process 400 that can be executed in accordance with implementations of the present disclosure. In some implementations, the example process 400 may be performed using one or more computer-executable programs executed using one or more computing devices.

Historical data is retrieved (402). In some examples, for multiple entities participating in private transactions to be recorded in a consortium DLS (e.g., E1 and E2), historical transaction data is retrieved. In some examples, the historical transaction data is retrieved from one or more transaction management systems (e.g., the transaction management systems 208 of FIG. 2) of one or more of the entities. A transaction model is provided (404). In some examples, a mathematical model describing one or more features (e.g., frequency, magnitude) of transactions within the historical transaction data is provided using one or more modeling techniques (e.g., curve-fitting, regression).

It is determined whether a transaction is to be recorded in the consortium DLS (406). If no transaction is to be recorded, the example process 400 loops back. If a transaction is to be recorded, it is determined whether the transaction is a private transaction (408). For example, a transaction management system 208 of a respective entity involved in the transaction can determine whether the transaction is a private transaction. If the transaction is not a private transaction, a transaction identifier, and transaction data are provided for consensus processing within the consortium DLS.

If the transaction is not a private transaction, a secret nonce value is determined (412). For example, a transaction management system 208 of one of the entities participating in the private transaction can determine the secret nonce value that is to be used. Using the examples above, if the private transaction is between E1 and E2 a first nonce value (shared secret) is used. As another example, if the private transaction is between E1, E2, and E3 a third nonce value (shared secret) is used. As another example, the private transaction is between E1 and E3, a fourth nonce value (shared secret) is used. An identifier is determined for the private transaction based on the secret nonce value, and a hash function (e.g., the first hash function).

Noisy transactions are generated (416). For example, a transaction management system 208 of one or more of the entities participating in the private transaction can calculate a number of noisy transactions that meet the bound of Equation 2, as described above, and sample noisy transactions from the transaction model (e.g., randomly, at intervals) to provide a set of noisy transactions. Identifiers for the noisy transactions are determined (418). For example, a transaction management system 208 of one or more of the entities participating in the private transaction can determine identifiers based on a nonce value, and a hash function (e.g., the second hash function). The transaction identifiers and transaction data for the private transaction, and the noisy transactions are provided for consensus processing (420).

The features described may be implemented in digital electronic circuitry, or in computer hardware, firmware, software, or in combinations of them. The apparatus may be implemented in a computer program product tangibly embodied in an information carrier (e.g., in a machine-readable storage device) for execution by a programmable processor; and method steps may be performed by a programmable processor executing a program of instructions to perform functions of the described implementations by operating on input data and generating output. The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, application-specific integrated circuits (ASICs).

To provide for interaction with a user, the features may be implemented on a computer having a display device such as a cathode ray tube (CRT) or liquid crystal display (LCD) monitor for displaying information to the user and a keyboard and a pointing device such as a mouse or a trackball by which the user may provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include, e.g., a local area network (LAN), a wide area network (WAN), and the computers and networks forming the Internet.

The computer system may include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method executed by at least one processor, the method comprising:
    determining, by the at least one processor, that a private transaction is to be recorded in a distributed ledger system (DLS) based on a consensus protocol executed by a set of entities participating in the DLS, the private transaction comprising a transaction between a subset of entities of the set of entities;
    providing, by the at least one processor, a set of noisy transactions based on a transaction model; and
    transmitting, by the at least one processor, data representative of at least a portion of the private transaction, and data representative of each noisy transaction in the set of noisy transactions for recording in the DLS based on the consensus protocol.

2. The method of claim 1, further comprising determining a number of noisy transactions to be generated for the set of noisy transactions based on a signal-to-noise ratio.

3. The method of claim 2, wherein the signal-to-noise ratio is determined for a current settlement period, and is based on a statistical value of private transactions across multiple settlement periods, and a statistical value of noisy transactions across the multiple settlement periods.

4. The method of claim 1, further comprising calculating an identifier assigned to the private transaction based on a hash function, and a secret nonce value that is shared between entities in the subset of entities.

5. The method of claim 1, wherein the transaction model is representative of one or more features of historical transaction data representative of transactions between entities in the subset of entities.

6. The method of claim 1, wherein the DLS comprises a consortium DLS.

7. The method of claim 1, wherein the private transaction, noisy transactions in the set of noisy transactions, and a plurality of public transactions are recorded in the DLS based on the consensus protocol.

8. One or more non-transitory computer-readable storage media coupled to one or more processors and having instructions stored thereon which, when executed by the one or more processors, cause the one or more processors to perform operations comprising:
    determining that a private transaction is to be recorded in a distributed ledger system (DLS) based on a consensus protocol executed by a set of entities participating in the DLS, the private transaction comprising a transaction between a subset of entities of the set of entities;
    providing a set of noisy transactions based on a transaction model; and
    transmitting data representative of at least a portion of the private transaction, and data representative of each noisy transaction in the set of noisy transactions for recording in the DLS based on the consensus protocol.

9. The one or more non-transitory computer-readable storage media of claim 8, wherein the operations further comprise: determining a number of noisy transactions to be generated for the set of noisy transactions based on a signal-to-noise ratio.

10. The one or more non-transitory computer-readable storage media of claim 9, wherein the signal-to-noise ratio is determined for a current settlement period, and is based on a statistical value of private transactions across multiple settlement periods, and a statistical value of noisy transactions across the multiple settlement periods.

11. The one or more non-transitory computer-readable storage media of claim 8, wherein the operations further comprise: calculating an identifier assigned to the private transaction based on a hash function, and a secret nonce value that is shared between entities in the subset of entities.

12. The one or more non-transitory computer-readable storage media of claim 8, wherein the transaction model is representative of one or more features of historical transaction data representative of transactions between entities in the subset of entities.

13. The one or more non-transitory computer-readable storage media of claim 8, wherein the DLS comprises a consortium DLS.

14. The one or more non-transitory computer-readable storage media of claim 8, wherein the private transaction, noisy transactions in the set of noisy transactions, and a plurality of public transactions are recorded in the DLS based on the consensus protocol.

15. A system, comprising:
   a computing device; and
   a computer-readable storage device coupled to the computing device and having instructions stored thereon which, when executed by the computing device, cause the computing device to perform operations comprising:
      determining that a private transaction is to be recorded in a distributed ledger system (DLS) based on a consensus protocol executed by a set of entities participating in the DLS, the private transaction comprising a transaction between a subset of entities of the set of entities;
      providing a set of noisy transactions based on a transaction model; and
      transmitting data representative of at least a portion of the private transaction, and data representative of each noisy transaction in the set of noisy transactions for recording in the DLS based on the consensus protocol.

16. The system of claim 15, wherein the operations further comprise: determining a number of noisy transactions to be generated for the set of noisy transactions based on a signal-to-noise ratio.

17. The system of claim 16, wherein the signal-to-noise ratio is determined for a current settlement period, and is based on a statistical value of private transactions across multiple settlement periods, and a statistical value of noisy transactions across the multiple settlement periods.

18. The system of claim 15, wherein the operations further comprise: calculating an identifier assigned to the private transaction based on a hash function, and a secret nonce value that is shared between entities in the subset of entities.

19. The system of claim 15, wherein the transaction model is representative of one or more features of historical transaction data representative of transactions between entities in the subset of entities.

20. The system of claim 15, wherein the DLS comprises a consortium DLS.

* * * * *